United States Patent [19]

Sasaki et al.

[11] Patent Number: 5,708,834
[45] Date of Patent: Jan. 13, 1998

[54] CLIENT-SERVER TYPE NETWORK

[75] Inventors: Kenichi Sasaki; Akibumi Mochizuki; Makoto Kawachi; Shigeyuki Hayashi, all of Tokyo; Yasuyoshi Katsuragawa, Yokohama; Fujio Saito, Yokohama; Mina Suzuki, Yokohama; Kazuhiko Ashizawa, Yokohama, all of Japan

[73] Assignee: Mitsubishi Denki Kabushiki Kaisha, Tokyo, Japan

[21] Appl. No.: 410,710

[22] Filed: Mar. 27, 1995

[30] Foreign Application Priority Data

Mar. 31, 1994 [JP] Japan ................. 6-063723

[51] Int. Cl.$^6$ ............................................. G06F 7/00
[52] U.S. Cl. .............. 395/800; 395/200.11; 364/DIG. 1; 364/242.94; 364/244.3
[58] Field of Search ................. 395/800, 200.12, 395/200.11, 182.13, 183.07, 185.01

[56] References Cited

U.S. PATENT DOCUMENTS

| | | | |
|---|---|---|---|
| 5,155,808 | 10/1992 | Shimizu | 395/200 |
| 5,249,293 | 9/1993 | Schreiber et al. | 395/650 |
| 5,329,619 | 7/1994 | Page et al. | 395/200 |
| 5,434,994 | 7/1995 | Shaheen et al. | 395/500 |
| 5,471,629 | 11/1995 | Risch | 395/800 |
| 5,506,999 | 4/1996 | Skillman et al. | 395/800 |
| 5,546,594 | 8/1996 | Wazumi | 395/800 |

FOREIGN PATENT DOCUMENTS

| | | |
|---|---|---|
| 3-204066 | 9/1991 | Japan . |
| 4-294434 | 10/1992 | Japan . |
| 5-28065 | 2/1993 | Japan . |

*Primary Examiner*—Mehmet B. Geckil
*Attorney, Agent, or Firm*—Wolf, Greenfield & Sacks, P.C.

[57] ABSTRACT

A client-server type network having at least two clients which execute the same kind of operation. The server and the clients are improved in order to realize addition or reduction in the number of clients. When the client is started, the fact that the client in under operation is recorded in the data base of the server. Since the addition of a client is automatically recorded in the server, the addition is easily facilitated. The server is provided with a client managing device for judging whether or not the client is under operation by polling. If the client is stopped due to a problem or the like, the fact is automatically recorded in the data base of the server. Therefore, it is also easy to eliminate the client from the data base of the server.

6 Claims, 13 Drawing Sheets

FLOW CHART OF THE OPERATION OF THE OPERATION
INITIATION NOTIFYING MEANS OF THE CLIENT IN Fig. 1

FLOW CHART OF THE OPERATION OF THE OPERATIONAL
STATE REQUESTING MEANS OF THE CLIENT IN Fig. 1

FLOW CHART OF THE OPERATION OF THE QUEUE EXTRACTING
MEANS OF THE CLIENT IN Fig. 1

FLOW CHART OF THE OPERATION OF THE QUEUE ELIMINATING
MEANS OF THE CLIENT IN Fig. 1

FLOW CHART OF THE OPERATION OF THE QUEUE EXTRACTING
DEVICE OF THE SERVER IN Fig. 1

FLOW CHART OF THE OPERATION OF THE QUEUE ELIMINATING
DEVICE OF THE SERVER IN Fig. 1

FLOW CHART OF THE OPERATION OF THE TRIGGER REQUESTING MEANS OF THE CLIENT IN Fig. 1

CLIENT-SERVER TYPE NETWORK

BACKGROUND OF THE INVENTION

1. Field of the Invention

The present invention relates to a client-server type network which is composed of a server and at least two clients used for the same kind of operation connected to a LAN (Local Area Network) and which is automatically increasing or reducing the number of clients.

2. Description of the Prior Art

Networks composed of a plurality of computers, terminals, etc. which are connected to a LAN are conventionally utilized. As one of such networks, what is called a client-server type network is known. FIG. 16 shows an example of the structure of the client-server type network. As shown in FIG. 16, the network includes a server and a plurality of clients each of which is connected to a LAN. In the network shown in FIG. 16, one operation is efficiently executed by the cooperation of a plurality of clients. In the case of executing one operation by the cooperation of a plurality of clients, the plurality of clients used for the same kind of operation are generally controlled by a control station. In the structure shown in FIG. 16, the control station is provided separately from the server, but the server also serves as a control station in many networks.

The operation of the network having the structure shown in FIG. 16 will now be explained.

In what is called a control station leading type network, the control station first allots a job to one of the clients under instructions from the server. In order to select the client to which the job is allotted, the control station polls all clients and supplies constant information to all clients. The control station also selects the client which has information to be supplied to the server at the request of the client, extracts the information and supplies it to the server.

In a client leading type network, the following operation is conducted. When a client has finished one job and starts another job, the client advances a request for information to the control station. When the control station receives the request, the control station allots a predetermined job to the client. In other words, the control station searches for a client which needs a job in the control station leading type network, while the client which needs a job demands a job from the control station in the client leading type network. In the client leading type network, when a client has predetermined information to be supplied to the server, the information is supplied to the server via the control station.

A technique on such a network is disclosed in Japanese Patent Laid-Open No. Hei 3-204066, in which a method of automatically providing a network address of each client is disclosed. Japanese Patent Laid-Open No. Hei 5-28065 discloses a method of controlling the stopping and resumption of the operation of a client, and Japanese Patent Laid-Open No. Hei 4-294434 discloses a method of dealing with a problem at the server.

In the above-described conventional techniques, however, a network including at least two clients which execute the same kind of operation has the following problems.

The control station leading type network has the following problems.

(1) When one of the clients which execute the same kind of operation has a problem and stops the operation in an emergency, a predetermined timeout is produced in order to detect the emergent stop. The timeout inconveniently exerts a bad influence on the efficiency of the network as a whole.

(2) It is necessary to automatically detect the resumption of the operation by the clients which execute the same kind of operation. It is therefore necessary to poll even a client which has not resumed the operation. This extra polling adversely affects the efficiency of the network. In order to prevent the resumption of the operation from adversely affecting the efficiency of the network, it is necessary to manually resume the operation.

(3) When the control station extracts information from a client, periodical polling is necessary, which increases the load on the LAN and the load of the control station.

(4) When a client is stopped due to a problem, since the client is stopped while holding information, the continuity of the information or the operation cannot be maintained.

(5) New definition is necessary in order to cause a new client to operate the same kind of operation.

The client leading type network has the following problems.

(1) Each of the clients which execute the same kind of operation polls the control station so as to know whether there is a job. Therefore, even if there is no job, there are more polling outputs on the LAN than in the control station leading type network, thereby increasing the load on the LAN and the load of the control station.

(2) When a client is stopped due to a problem, since the client is stopped while holding information, the continuity of the information or the operation cannot be maintained.

SUMMARY OF THE INVENTION

Accordingly, it is an object of the present invention to eliminate the above-described problems in the prior art.

(1) It is a first object of the present invention not to influence other clients under operation at the time of detecting the resumption of the same kind of operation by one client or to dispense with manual starting by providing a server with a registering function and a controlling function.

(2) It is a second object of the present invention not to influence other clients under operation, even if one of the clients which execute the same kind of operation is stopped in an emergency due to a problem by providing the server with a function of confirming whether or not a client is stopped in an emergency by polling.

(3) It is a third object of the present invention to prevent an increase in the load on the LAN or to reduce the load of the control station or a client due to polling for receiving information by providing a client with a function of setting information in the server and directly triggering a client to which information is supplied, and a function of recognizing a trigger which is supplied from another client.

(4) It is a fourth object of the present invention to ensure the continuity of the operation when a client is stopped in an emergency by providing a client with what is called a separating function including a queue excluding function, a queue taking function and a queue eliminating function.

To achieve these aims, in a first aspect of the present invention, there is provided a client-server type network comprising: a server; at least one first client having an address; and a second client which executes an operation different from the operation of the first client, the second client having an address; the server including: memory means for determining that each of the first and the second client is under operation when the first and second client is under operation, and storing the addresses of the first and the second clients which are under operation; request transferring means for transferring a request for status information of the operational state of one of the first and the second clients which are under operation when the request is advanced from another of the first or the second clients; storage means for receiving information from the first and the second client and storing the information in a queue; information providing means for extracting predetermined information from a queue in accordance with a request when the first and the second client requests the predetermined information and supplying the predetermined information to the client which requests the predetermined information; and information changing means for determining termination of operation of the first or the second client has occurred and changing the status information in the memory means indicating that the first or second client client is under operation to information indicating that the first (second) client no longer operating the first or second client advances either a request a termination of operation or a request for periodical polling so as to deal with an emergency termination of operation due to a problem; and each of the first and the second clients including: first notifying means for notifying the server after the first or second client which has begun operation that the first or second client is under operation; information extract requesting means for requesting the server to extract information from a queue when the first or second client has begun operation; and second notifying means for notifying one of the first and second clients that information has been set in the server by triggering one of the first and second clients.

In a second aspect of the present invention, there is provided a client-server type network comprising: a server; and a plurality of clients; the server including: operating client managing means for receiving a log-in request from one of the clients which starts operations, and updating a log-in name and a network address of the client in accordance with instructions for setting the log-in name and the network address in a data base; queue generating means for receiving a queuing request from the client, generating a new queue if there is no directory for queuing or when the client issues an instruction for newly generating a queue as a result of a judgement by the client; queue receiving means for generating queue information in the form of a file after the new queue is generated or by the judgement of the client; queue extracting means for receiving a dequeing request from the client, detects the queue file the basis of the queue name, and supplying the detected queue file to the client; information supplying means for taking out an operational state of the client, the log-in name and the network address from the data base in response to a request from a client and supplying the operational state, the log-in name and the network address taken from the data base to the client which generated the request; information eliminating means for terminating of operation of the client and eliminating information from the data base, when the information eliminating means receives a request for termination of operation, namely, a log-out request from the client, eliminating the information on the operational state of the client from the data base when emergency termination of operation of the client due to a problem is recognized; and queue eliminating means for eliminating the information in the queue file in accordance with the entry name of the queue supplied from the client; and each of the clients including: operation initiation notifying means for notifying the initiation of an operation of a client the server by using a log-in command when the client starts the operation and instructing the server to set the log-in name and the network address of the client corresponding to the log-in name in the data base in the server; queue requesting means for requesting the server to queue information and, if the server does not have the queue, requesting the server to generate a file directory in accordance with the queue name which is determined in advance and to set information in at the generated queue; queue extracting means for requesting the server to take out information from the queue on the basis of a specified queue name; operational state requesting means for requesting the server to take out the log-in name and the network address of the client under operation from the data base of the server in order to determine which clients are executing the same kind of operation after the server queues information; trigger requesting means for obtaining the network addresses of all the clients which are executing the same kind of operation through the operating client managing means after the server queues information and triggering all the clients by using a communication protocol at a lower level; wait condition setting means for setting a wait condition in the client by asynchronous interrupt, in order to receive a trigger by using a protocol at a lower level in the network in order to receive information from another client; trigger information receiving means for receiving trigger information while suspending the job under operation when the trigger information is supplied from another client while the wait condition is set, and returning the client to interruption processing after the client receives trigger information; trigger information recognizing means for judging whether or not trigger information has been delivered at every end of a normal job, and recognizing the trigger information when the trigger information has been delivered; and elimination requesting means for requesting the server to eliminate the cue information when a predetermined processing is successfully completed.

In a third aspect of the present invention, there is provided a server for a client-server type network having a server, at least one first client and a second client which is different from the first client and which executes the same kind of operation as the first client, the first client having an address and the second client also having an address, the server comprising: memory means for determining that each of the first and the second client is under operation when the first and second client are under operation, and storing the addresses of one of the first and the second clients which are under operation; request transferring means for transferring a request for status information of an operational state of one of the first and the second client which are under operation when the request is advanced from another of the first and the second client; storage means for receiving information from the first and the second client and storing the information in a queue; information providing means for extracting predetermined information from a queue in accordance with a request when the first or the second client requests the predetermined information and supplying the predetermined information to the client which requests the predetermined information; and information changing means for judging termination of operation of the first or the second client and changing the status information in the memory means indicating that the first or second client is under operation to information indicating that the first or second client is no longer operating, or when the first or second client advances either a request for a termination of operation or a request for periodical polling so as to deal with an emergency termination of operation due to a problem.

In a fourth aspect of the present invention, there is provided a client for a client-server type network which is used as a first or a second client in a client-server type network having a server, at least one first client which executes an operation and a second client which executes an operation different from the first client, the client comprising: first notifying means for notifying the server after the first or second client is started that the first or second client is under operation; information extract requesting means for requesting the server to extract information from a queue after the first or second client is started; and the second notifying means for notifying the second or first client that information has been set in the server by triggering the second or first client on the basis of the information received from the server.

In a fifth aspect of the present invention, there is provided a server for a client-server type network having a server and a plurality of clients; the server comprising: operating client managing means for receiving a log-in request from one of the clients which starts operation and updating log-in name and a network address for the client in accordance with instructions for setting the log-in name and the network address in a data base; queue generating means for receiving a queuing request from the client, and generating a new queue if there is no directory for queuing or when the client issues an instruction for newly generating a queue as a result of a judgement by the client; queue receiving means for generating queue information in the form of a file by utilizing a FIFO after the new queue generated or by the judgement of the client; queue extracting means for receiving a dequeuing revest from the client, detecting the queue file in the FIFO on the basis of the queue name, and supplying the detected cue file to the client; information supplying means for extracting the operational state of the client, the log-in name and the network address from the data base in response to a request from a client and supplying the operational state, the log-in name and the network address extracted from the data base to the client which has output the request; information eliminating means for terminating the operation of the client and eliminating information from the data base, when the information eliminating means receives a request for termination of operation, namely, a log-out request from the client, eliminating the information on the operational state of the client from the data base when emergency termination of operation of the client due to a problem is recognized; and queue eliminating means for eliminating the information in the queue, in accordance with the entry name of the queue supplied from the client.

In a sixth aspect of the present invention, there is provided a client for a client-server type network having a server and a plurality of clients; the client comprising: operation initiation notifying means for notifying the initiation of an operation of a client to the server by using a log-in command when the client starts the operation, and instructing the server to set a log-in name and the network address of the client corresponding to the log-in name in a data base in the server; queue requesting means for requesting the server to queue information and, if the server does not have the queue, requesting the server to generate a file directory in accordance with the queue name and to set information in the generated queue; queue extracting means for requesting the server to extract information from the queue on the basis of a specified queue name; an operational state requesting means for requesting the server to take out the log-in name and the network address of the corresponding client under operation from the data base of the server in order to determine which clients are executing the same kind of operation after the server queues information; trigger requesting means for obtaining the network addresses of all the clients which are executing the same kind of operation through the operating client managing means after the server queues information and triggering all the clients by using a communication protocol at a lower level; wait condition setting means for setting a wait condition in the client by asynchronous interruption, namely, interruption which does not affect a normal operation in order to receive a trigger by using a protocol at a lower level in the network in order to receive information from another client; trigger information receiving means for receiving trigger information while suspending the job under operation when the trigger information is supplied from another client while the wait condition is set, and returning the client to interrupt processing after the client receives trigger information; trigger information recognizing means for judging whether or not trigger information has been delivered at every end of a normal job, and recognizing the trigger information when the trigger information has been delivered; and elimination requesting means for requesting the server to eliminate the queue information when a predetermined processing is successfully completed.

The FIFO here is an abbreviation of "First In First Out", which is a data buffer device for outputting data in the order of inputting, namely, for outputting first the data that is input first.

According to these structures, since it is easy to detect the initiation of the operation by a client, the registering function and the control function of the server are easily reinforced.

Since whether or not a client is stopped in an emergency is judged by polling, the emergency stop does not affect other clients.

Each client has a function of directly triggering a client to which information is supplied, and a function of recognizing a trigger which is supplied from another client. It is therefore possible to prevent an increase in the load on the LAN.

Since cue excluding processing, queue taking processing, and queue eliminating processing are possible even if a client is stopped in an emergency, the continuity of the operation is ensured.

The above and other objects, features and advantages of the present invention will become clear from the following description of the preferred embodiments thereof, taken in conjunction with the accompanying drawings.

DESCRIPTION OF THE PREFERRED EMBODIMENTS

First Embodiment

Figure 1:
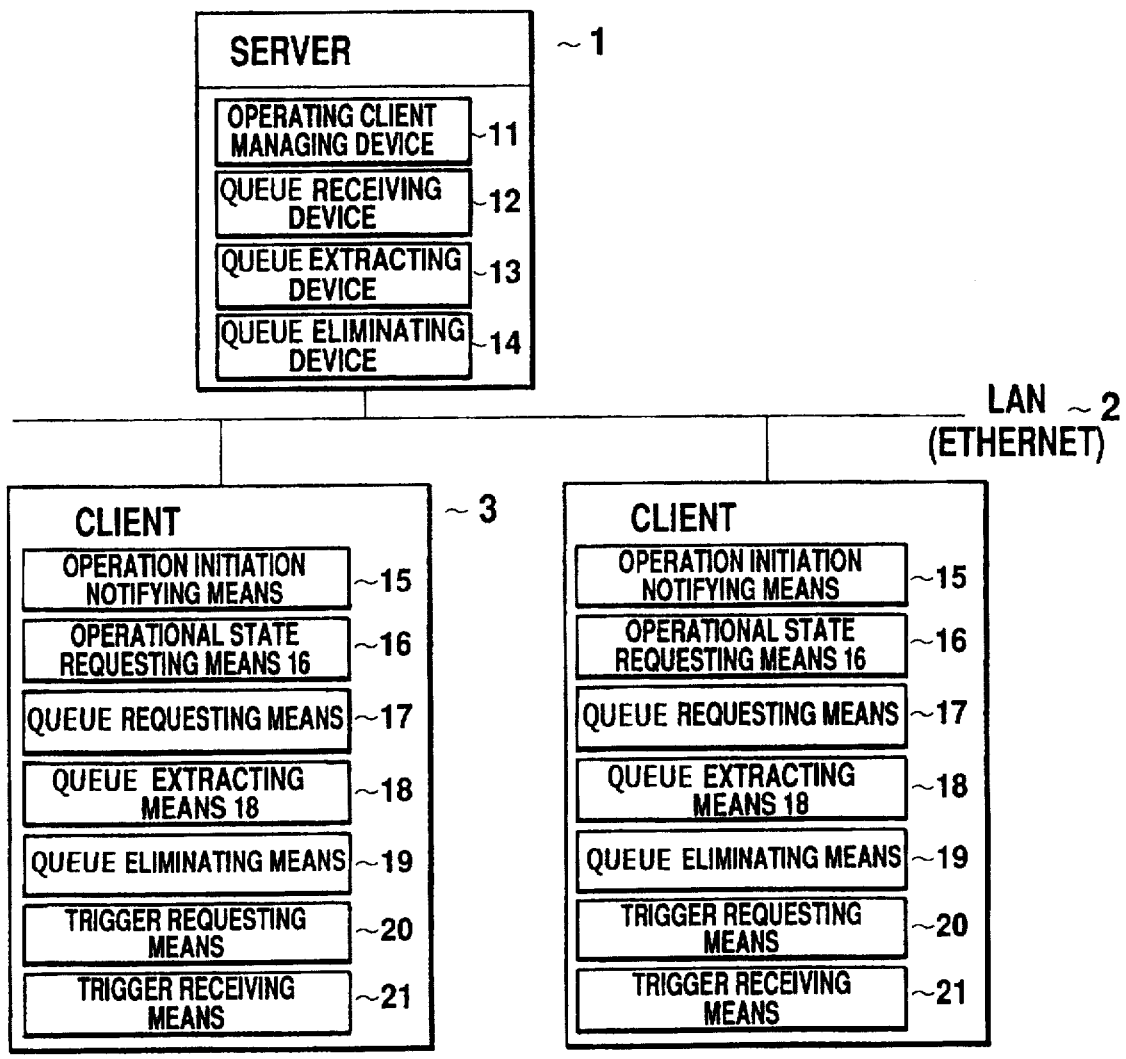
FIG. 1 is a block diagram showing the structure of a first embodiment of the present invention.

A first embodiment of the present invention will be explained herein with reference to FIG. 1. FIG. 1 is a block diagram of a first embodiment of a client-server type network according to the present invention. As shown in FIG. 1, the network is mainly composed of a LAN 2 which is cable network to which a server 1 and clients 3 are connected. The server 1 which executes managing and controlling service as the kernel of the network as a whole, and a plurality of clients 3 which actually conduct operations are connected to the LAN 2. The server 1 is provided with an operating client managing device 11 for judging the state of a client under operation and managing the client, a queue receiving device 12, a queue taking device 13 and a queue eliminating device 14. In the first embodiment, the queue receiving device 12, the queue taking device 13 and the queue eliminating device 14 are collectively called a queue service device. The client 3 is provided with an operation initiation notifying means 15 and an operational state requesting means 16, as shown in FIG. 1. The operation initiation notifying means 15 and the operational state requesting means 16 are collectively called an operational state managing means in the first embodiment. The client 3 is also provided with a queue service device in the same way as the server 1. The queue service device of the client 3 includes a queue requesting means 17, a queue extracting means 18 and a queue eliminating means 19. The client 3 is further provided with trigger means. The trigger means is composed of a trigger requesting means 20 and a trigger receiving means 21, as shown in FIG. 1.

Figure 2:
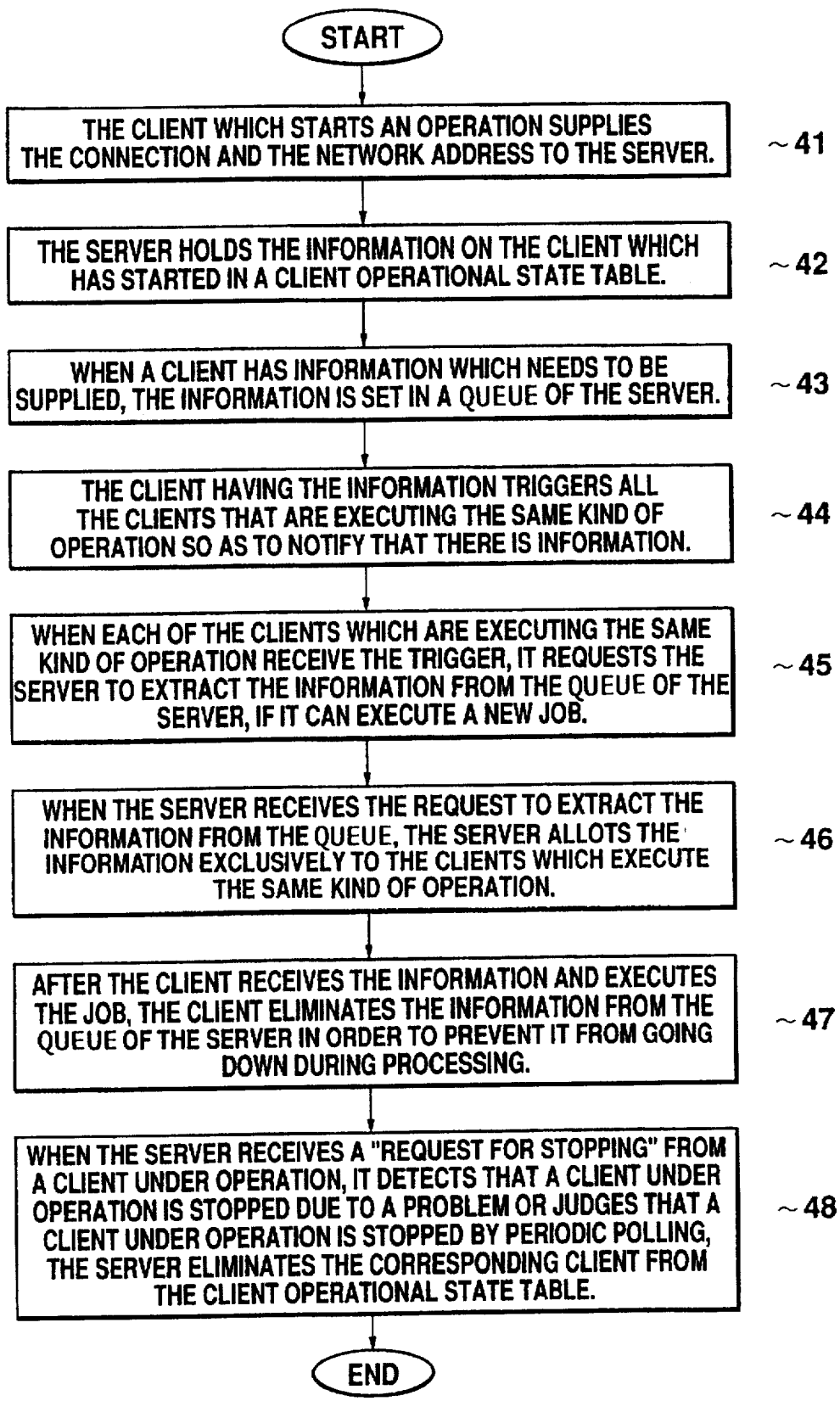
FIG. 2 is a flow chart of the processing in the first embodiment shown in FIG. 1.

The operation of the first embodiment of a client-server type network will now be explained in detail with reference to the flow chart in FIG. 2.

At step 41, the client 3 which starts an operation supplies the connection and the network address to the server 1 by using the operation initiation notifying means 15 (which will be described later with reference to FIG. 3). The operation initiation notifying means 15 corresponds to the first notifying means in the present invention.

At step 42, the server 1 receives the connection request from the client 3 by using the operating client managing means 11 (which will be described later with reference to FIG. 5) and deals with the request. The operating client managing means 11 serves as the memory means and the storage means in the present invention.

At step 43, the client 3 having information which needs to be supplied requests the server 1 to set the information by using the queue requesting means 17 (which will be described later with reference to FIG. 6). The server 1 deals with the request by using the queue receiving device 12 (which will be described later with reference to FIG. 9). At step 44, the client 3 having the predetermined information receives the information on the clients 3 under operation and the addresses thereof from the server 1 by using the operational state requesting means 16 (which will be described later with reference to FIG. 4) and supplies a trigger to the clients 3 on the basis of the information on the clients 3 and the addresses thereof by using the trigger requesting means 20 (which will be described later with reference to FIG. 12) so as to trigger all the clients 3 that the client 3 requests to execute a predetermined job and, in addition, that are executing the same kind of operation.

The operational state requesting means 16 is an example of the information extract requesting means in the present invention, and the trigger requesting means 20 is an example of the second notifying means in the present invention.

At step 45, the trigger is supplied to the clients 3 which are executing the same kind of operation and which are waiting for the instruction for a predetermined job by asynchronous interrupt. Each of the clients 3 periodically checks the data (it is important here that the periodical check is not a check of the data flowing on the LAN 2 but the check of the data in the tables within the clients 3), and the client 3 which has received the trigger by using the trigger receiving means 21 (which will be described later with reference to FIG. 13) requests the server 1 to extract the predetermined information by using the queue extracting means 18.

The queue extracting means 18 is an example of the information extract requesting means in the present invention.

At step 46, the server 1 receives the request from the queue extracting means 18 (which will be described later with reference to FIG. 7) of the client 3 and exclusively extracts the information, which is dealt with as being under processing, by the queue extracting device 13 (which will be described later with reference to FIG. 10) and supplies the information to the client 3.

The queue extracting device 13 is an example of the information providing means in the present invention.

At step 47, the client 3 executes the predetermined job on the basis of the supplied information. When the job is finished, the client 3 requests the server 1 to eliminate the queue by using the queue eliminating means 19 (which will be described later with reference to FIG. 8).

The queue eliminating means 19 is an example of the elimination requesting means in the present invention.

When the server 1 receives the request for eliminating the queue, it eliminates the queue by using the queue eliminating device 14 (which will be described later with reference to FIG. 11). The queue eliminating device 14 is an example of the queue eliminating means in the present invention.

At step 48, when the server 1 receives a "request for stopping" from a client 3 under operation, and detects that a client 3 under operation is stopped due to a problem or judges that a client 3 under operation is stopped by periodical polling, the server 1 eliminates the corresponding client 3 from a client operational state table.

Figure 3:
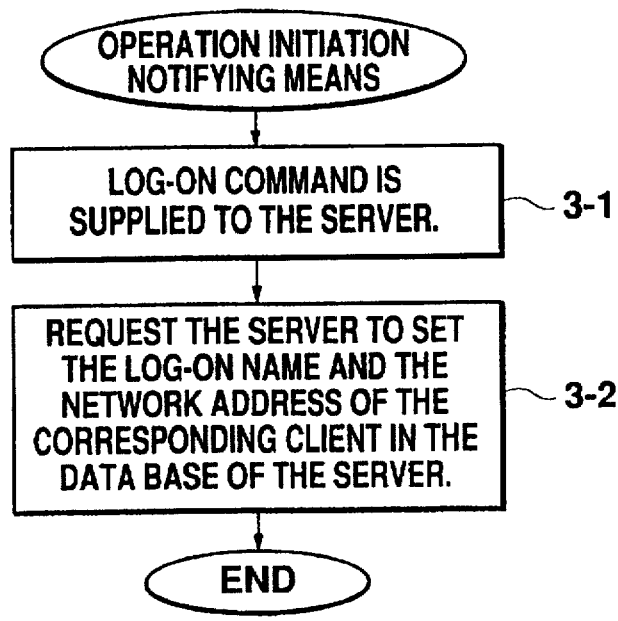
FIG. 3 is a flow chart of the operation of the operation initiation notifying means of the client in the first embodiment shown in FIG. 1.

FIG. 3 is a flow chart of the operation of the operation initiation notifying means 15 of the client 3 in FIG. 1.

As shown in FIG. 3, a log-on command is supplied to the server 1 at step 3-1.

At step 3-2, the server 1 is requested to set the log-on name and the network address of the corresponding client 3 in the data base of the server 1.

Due to this operation, the client under operation is registered in the data base of the server 1 in accordance with the log-on command.

Figure 4:
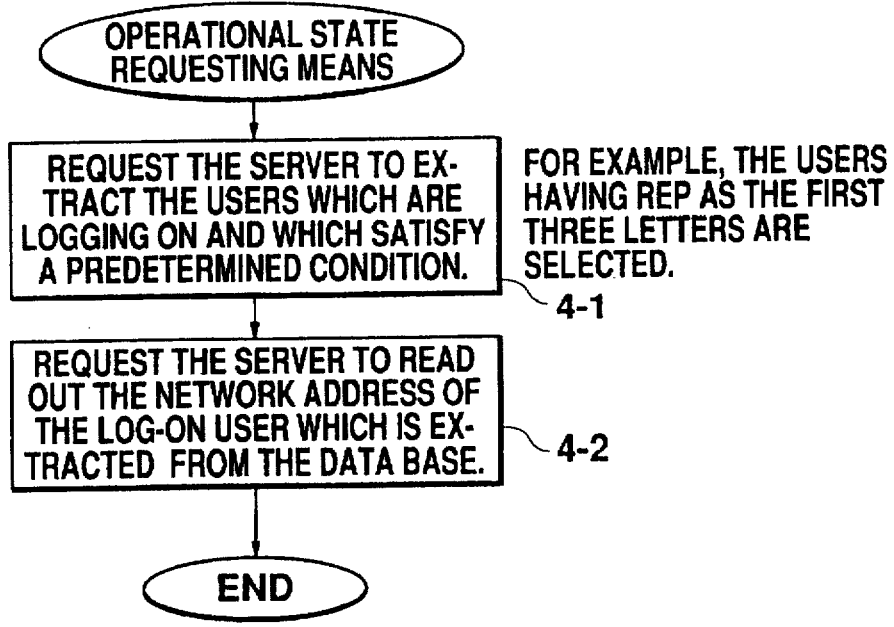
FIG. 4 is a flow chart of the operation of the operational state requesting means of the client in the first embodiment shown in FIG. 1.

FIG. 4 is a flow chart of the operation of the operational state requesting means 16 of the client 3 in FIG. 1. The operational state requesting means 16 is an example of the first notifying means in the present invention.

At step 4-1, the users which are logging on and which satisfy a predetermined condition are extracted when the operational state requesting means 16 requests the server 1. The condition is, for example, that the first three letters of the user are REP.

At step 4-2, the network address of the log-on user which is extracted at the step 4-1 is extracted from the data base. The server 1 supplies the network address extracted from the data base to the client 3 in response to the request from the client 3.

Figure 5:
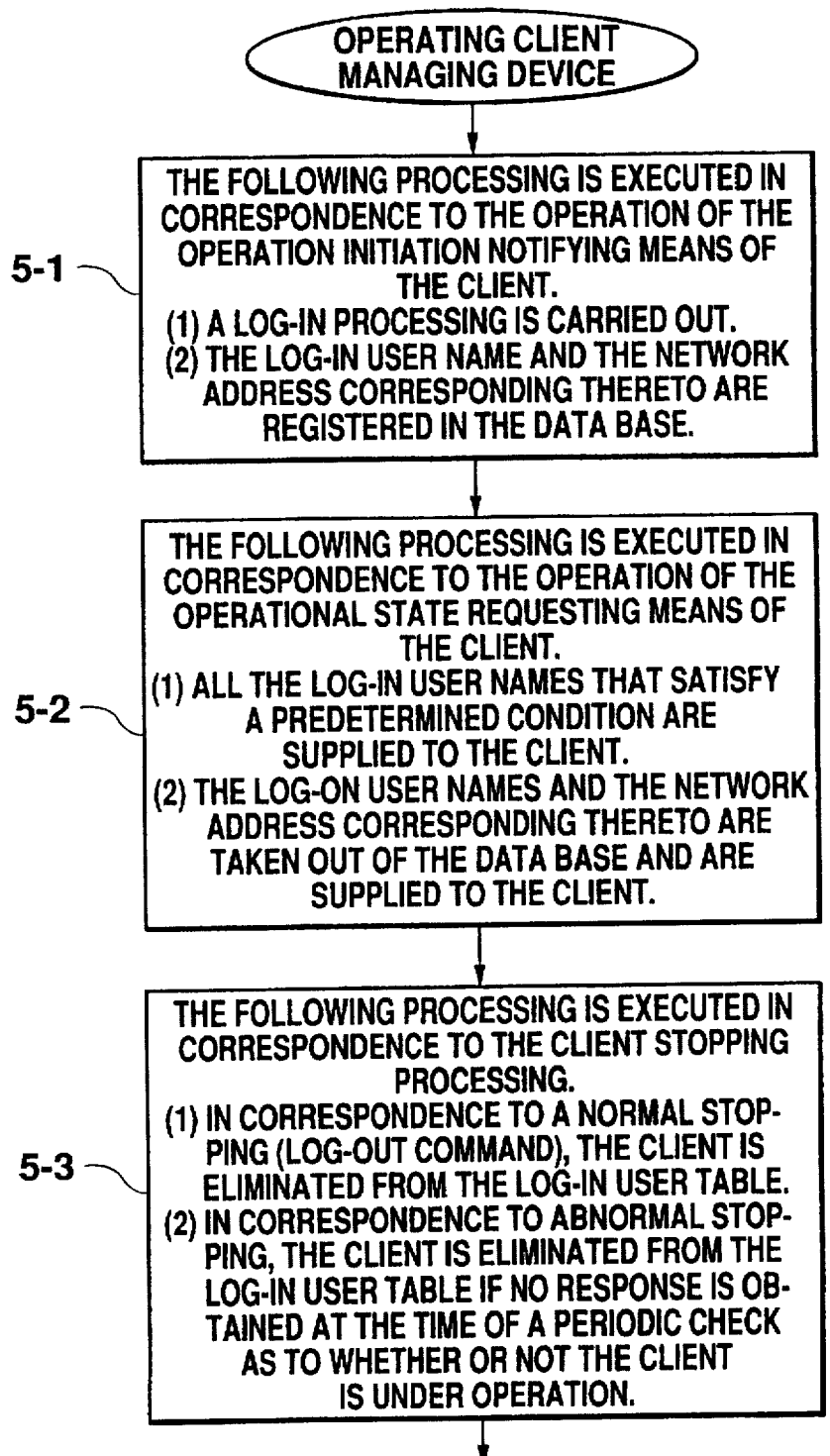
FIG. 5 is a flow chart of the operation of the operating client managing device of the server in the first embodiment shown in FIG. 1.

FIG. 5 is a flow chart of the operation of the operating client managing device 11 of the server 1 in FIG. 1. The operating client managing device 11 is an example of the memory means and the storage means in the present invention.

At step 5-1, the following processing is executed in correspondence to the the operation of the operation initiation notifying means 15 of the client 3. A log-in processing is first carried out, and the log-in user name and the network address corresponding thereto are registered in the data base within the server 1.

At step 5-2, the following processing is executed in correspondence to the operation of the operational state requiring means 16 of the client 3. All the log-in user names that satisfy a predetermined condition are first supplied to the client 3. The log-on user names and the network addresses corresponding thereto are next taken out of the data base and are supplied to the client 3.

At step 5-3, the following processing is executed in correspondence to the client stopping processing. In correspondence to normal stopping (log-out command), the client is eliminated from the log-in user table. In correspondence to abnormal stopping, the client is eliminated from the log-in user table if no response is obtained to a periodic check as to whether or not the client 3 is under operation.

Figure 6:
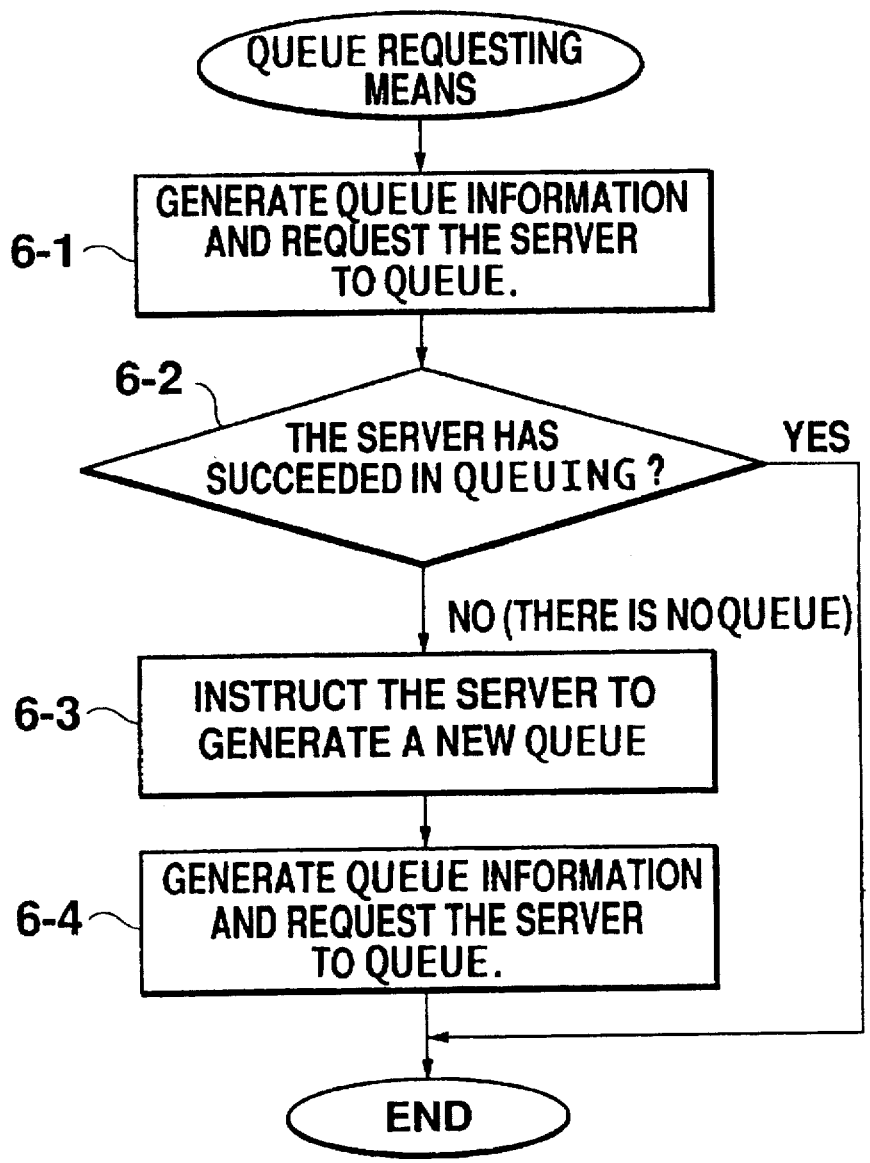
FIG. 6 is a flow chart of the operation of the queue requesting means of the client in the first embodiment shown in FIG. 1.

FIG. 6 is a flow chart of the operation of the queue requesting means 17 of the client 3 in FIG. 1. The queue requesting means 17 is an example of the queue requesting means in the present invention. As shown in FIG. 6, at step 6-1, queue information is first generated, and the server 1 is requested to queue. At step 6-2, judgement is made as to whether or not the server 1 has succeeded in queuing. If the answer is YES, the operation of the queue requesting means 17 is finished. On the other hand, if the answer is NO, the process proceeds to the next step 6-3.

At the step 6-3, the server 1 is instructed to generate a new queue.

At step 6-4, queue information is generated and the server 1 is requested to queue. In this manner, if the queue is not there, new queue information is generated and queuing is executed.

Figure 7:
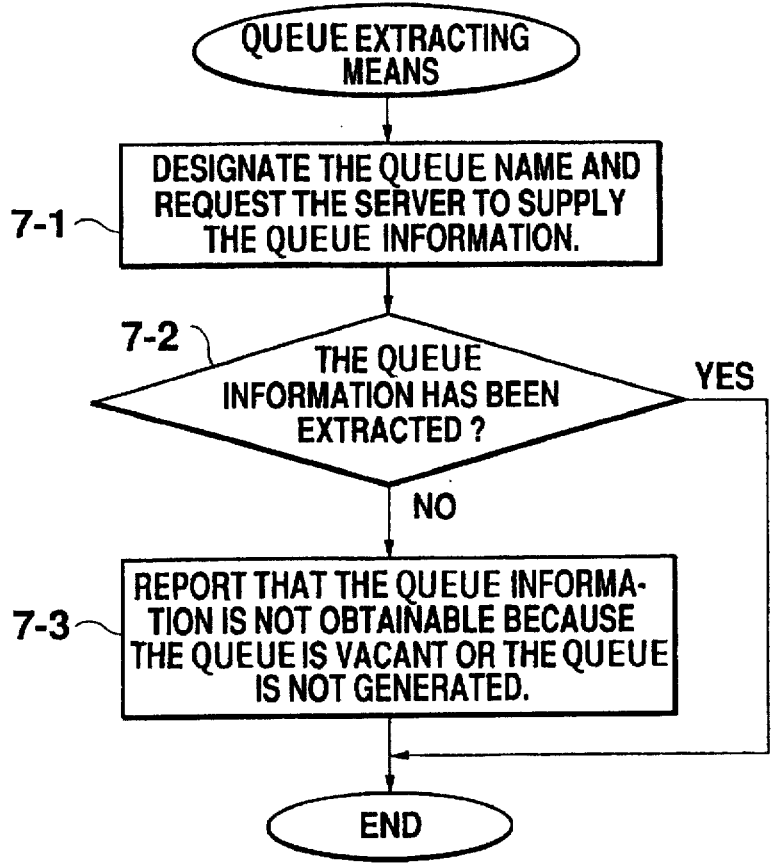
FIG. 7 is a flow chart of the operation of the queue extracting means of the client in the first embodiment shown in FIG. 1.

FIG. 7 is a flow chart of the operation of the queue extracting means 18 of the client 3 in FIG. 1. The queue extracting means 18 is an example of the queue extracting means in the present invention. At step 7-1, the queue name is designated and the server 1 is requested to supply queue information.

At step 7-2, judgement is made as to whether or not the queue information has been extracted. If the answer is YES, the operation of the queue extracting means 18 is finished. On the other hand, if the answer is NO, the process proceeds to the next step 7-3.

At the step 7-3, the queue extracting means 18 reports that the queue information is not obtainable because the queue is vacant or the queue is not generated.

Figure 8:
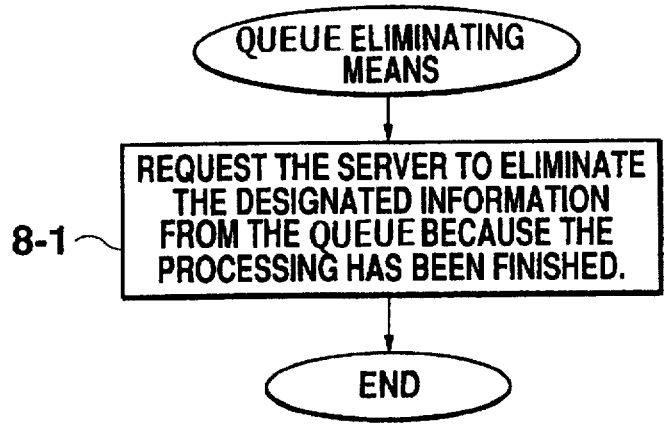
FIG. 8 is a flow chart of the operation of the queue eliminating means of the client in the first embodiment shown in FIG. 1.

FIG. 8 is a flow chart of the operation of the queue eliminating means 19 of the client 3 in FIG. 1. The queue eliminating means 19 is an example of the elimination requesting means in the present invention.

At step 8-1, the server 1 is requested to eliminate the designated information from the queue because the processing has been finished.

Figure 9:
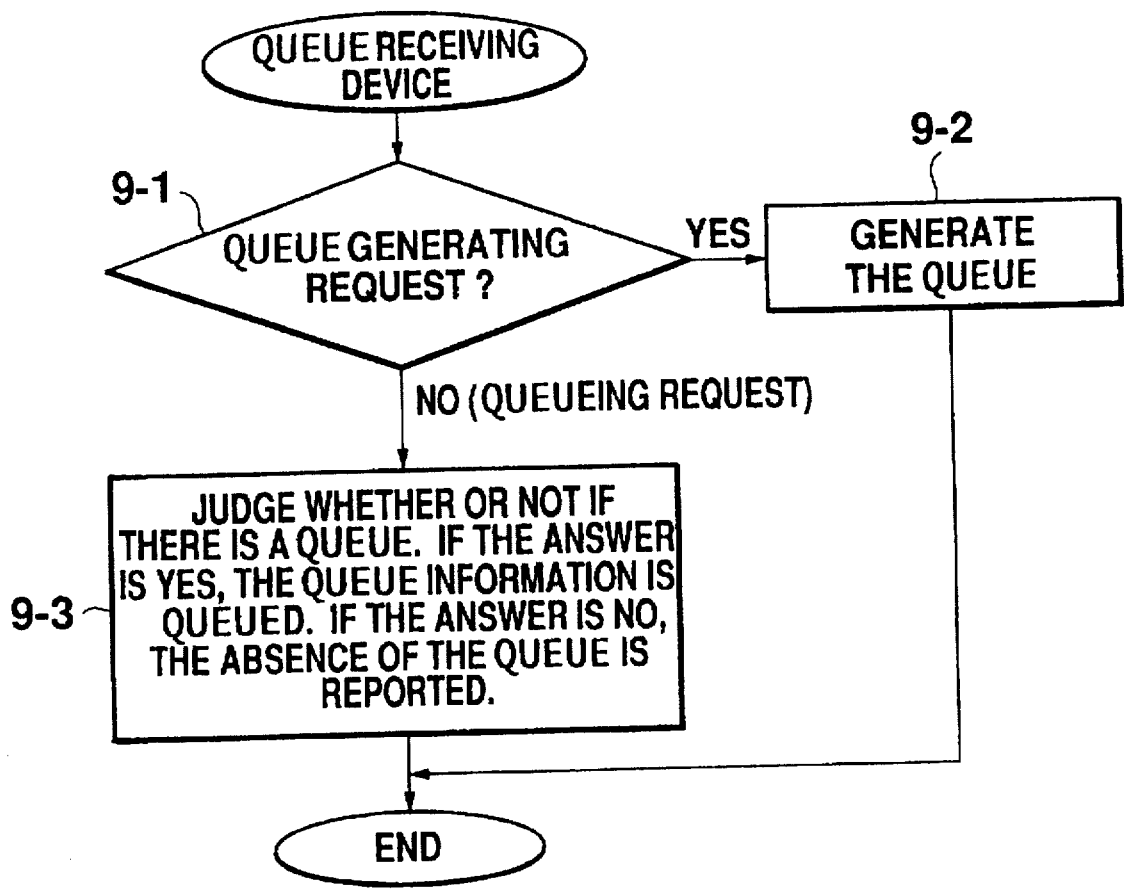
FIG. 9 is a flow chart of the operation of the queue receiving device of the server in the first embodiment shown in FIG. 1.

FIG. 9 is a flow chart of the operation of the queue receiving device 12 of the server 1 in FIG. 1. The queue receiving device 12 is an example of the queue generating means in the present invention.

As shown in FIG. 9, at step 9-1, a queue generating request is issued. If this request is received, a queue is generated at step 9-2. When the queue is generated, the operation of the queue receiving device 12 is finished.

On the other hand, if the queue is not generated after the queue generating request is issued, judgement is made as to whether or not the queue exists at step 9-3. If there is a cue, the cue information is cued. If the queue is not there, the absence of the queue is reported.

Figure 10:
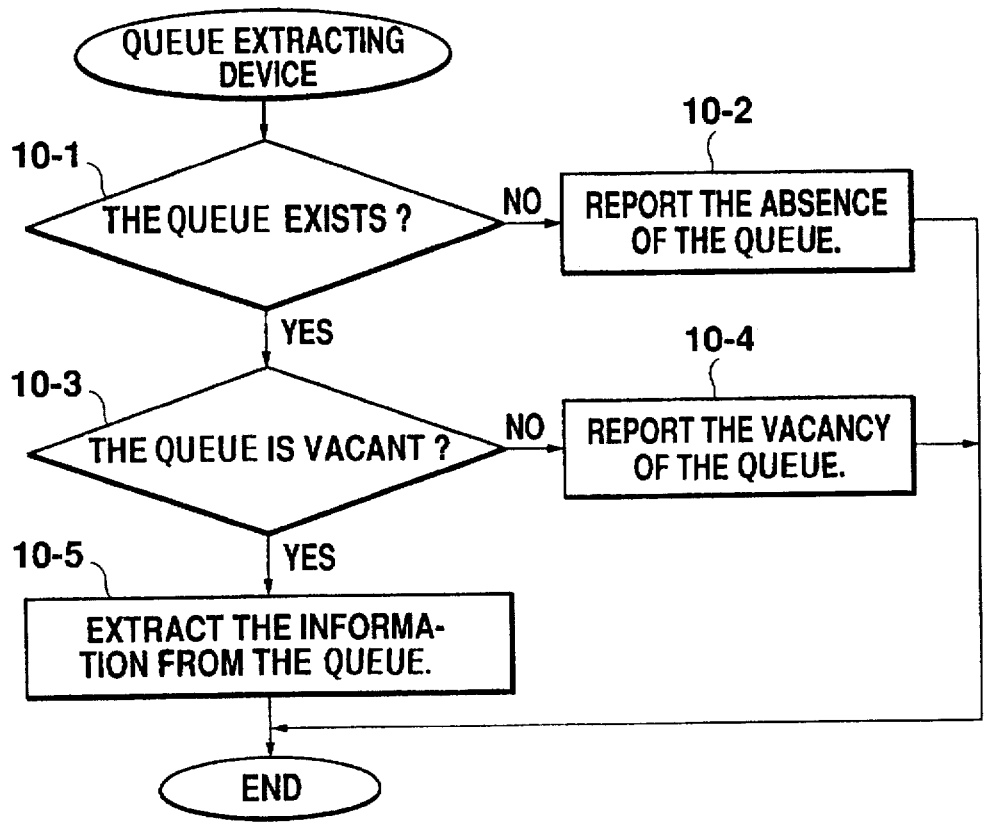
FIG. 10 is a flow chart of the operation of the queue taking device of the server in the first embodiment shown in FIG. 1.

FIG. 10 is a flow chart of the operation of queue extracting device 13 of the server 1 in FIG. 1. The queue extracting device 13 is an example of the queue extracting means of the present invention.

As shown in FIG. 10, at step 10-1, whether or not the queue exists is first judged. If the queue is not there, the absence of the queue is reported at step 10-2, and the operation of the queue extracting means 13 is finished. On the other hand, if the queue is there, the process proceeds to the next step 10-3.

At the step 10-3, judgement is made as to whether or not the queue is vacant. If the cue is vacant, the vacancy of the queue is reported at step 10-4. On the other hand, if the queue is not vacant, the process proceeds to the next step 10-5.

Figure 11:
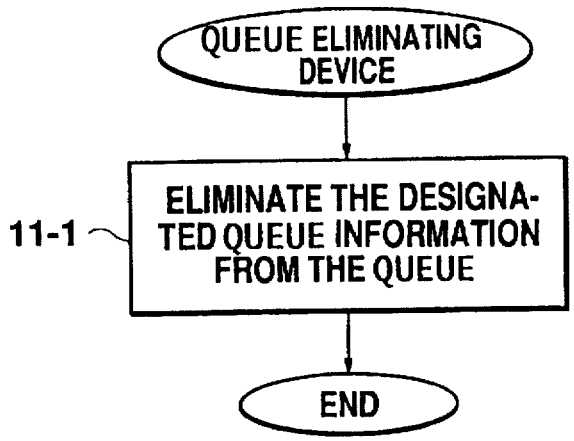
FIG. 11 is a flow chart of the operation of the queue eliminating device of the server in the first embodiment shown in FIG. 1.

FIG. 11 is a flow chart of the operation of the queue eliminating device 14 of the server 1 in FIG. 1. The queue eliminating device 14 is an example of the queue eliminating means in the present invention.

As shown in FIG. 11, at step 11-1, the designated queue information is eliminated from the queue, thereby finishing the operation of the queue eliminating device 14.

Figure 12:
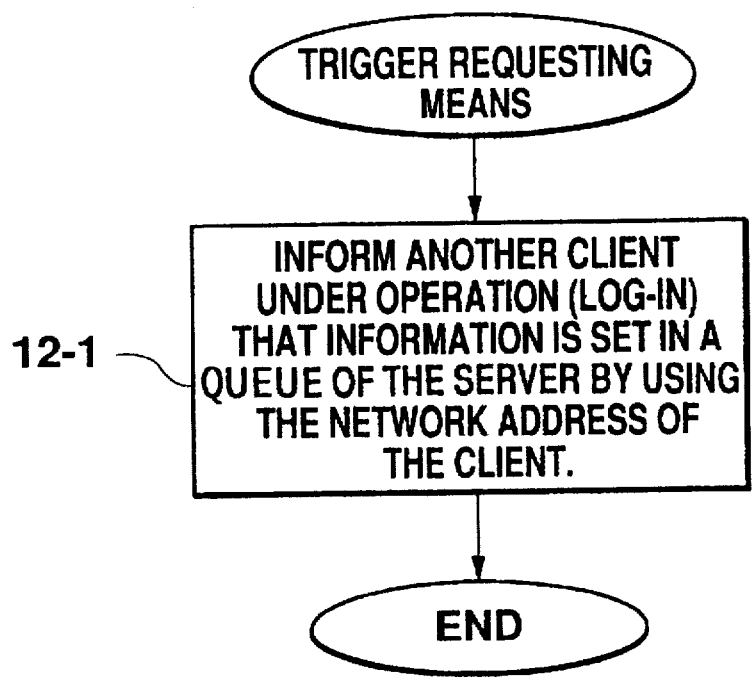
FIG. 12 is a flow chart of the operation of the trigger requesting means of the client in the first embodiment shown in FIG. 1.

FIG. 12 is a flow chart of the operation of the trigger requesting means 20 of the client 3 in FIG. 1. The trigger requesting means 20 is an example of the trigger requesting means of the present invention.

As shown in FIG. 12, at step 12-1, it is informed to another client under operation (namely, log-in client) that information is set at a queue of the server by using the network address of the client. The operation of the trigger requesting means 20 is then finished.

Figure 13:
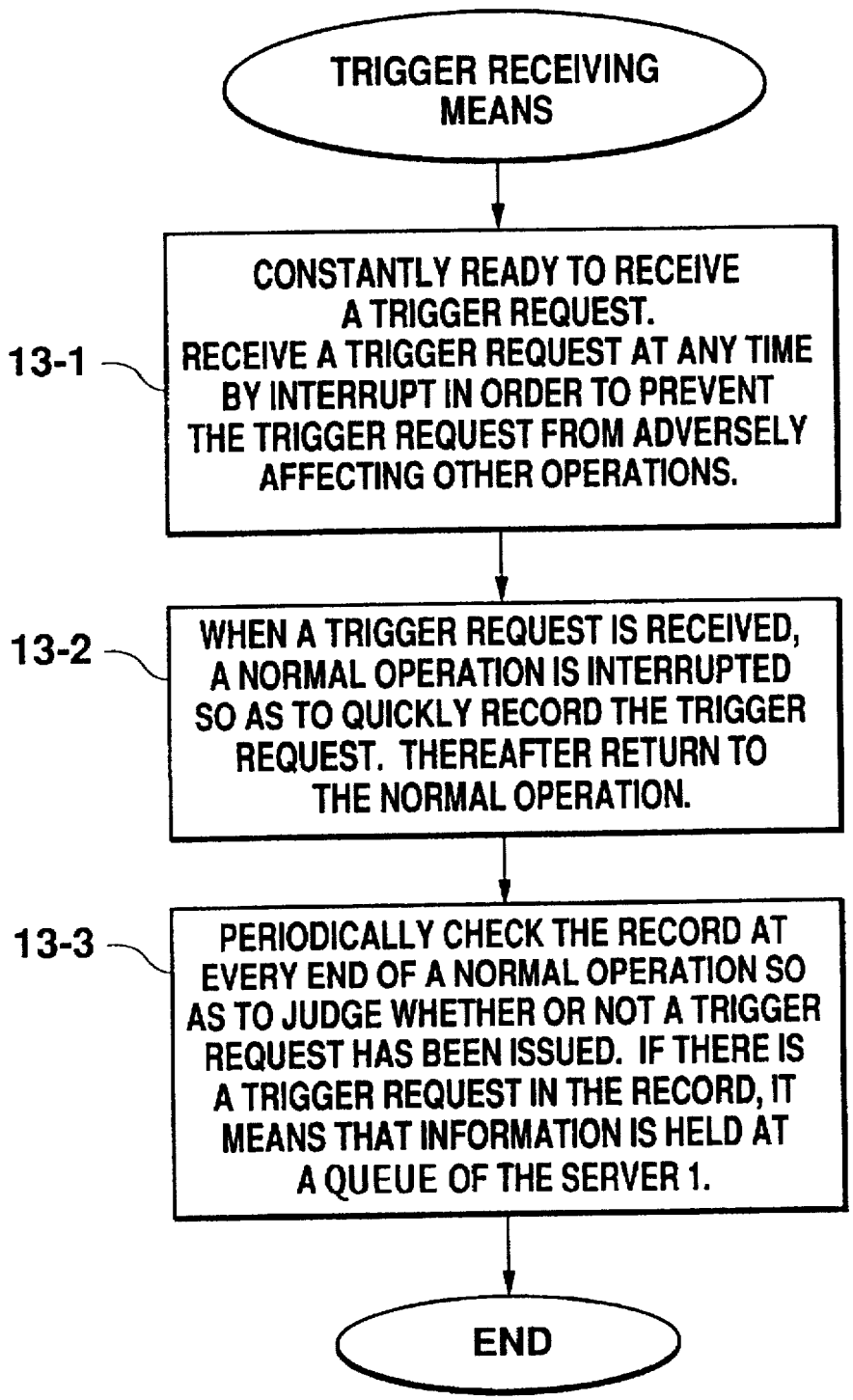
FIG. 13 is a flow chart of the operation of the trigger receiving means of the client in the first embodiment shown in FIG. 1.

FIG. 13 is a flow chart of the operation of the trigger receiving means 21 of the client 3 in FIG. 1. The trigger receiving means 21 of the client 3 is an example of the trigger information receiving means in the present invention.

As shown in FIG. 13, at step 13-1, the trigger receiving means 21 is constantly ready to receive a trigger request. In other words, a trigger request is received at any time by interruption in order to prevent the trigger request from adversely affecting other operations.

At step 13-2, when a trigger request is received, a normal operation is interrupted so as to quickly record the trigger request. After recording the trigger request, the operation is returned to the normal operation.

At step 13-3, the record produced at the step 13-2 is periodically checked at every end of a normal operation so as to judge whether or not a trigger request has been issued. If a predetermined trigger request has been recorded and is held in the record, it means that information is held at queue of the server 1. The operation of the trigger receiving means 21 is thus finished.

Second Embodiment

Figure 14:
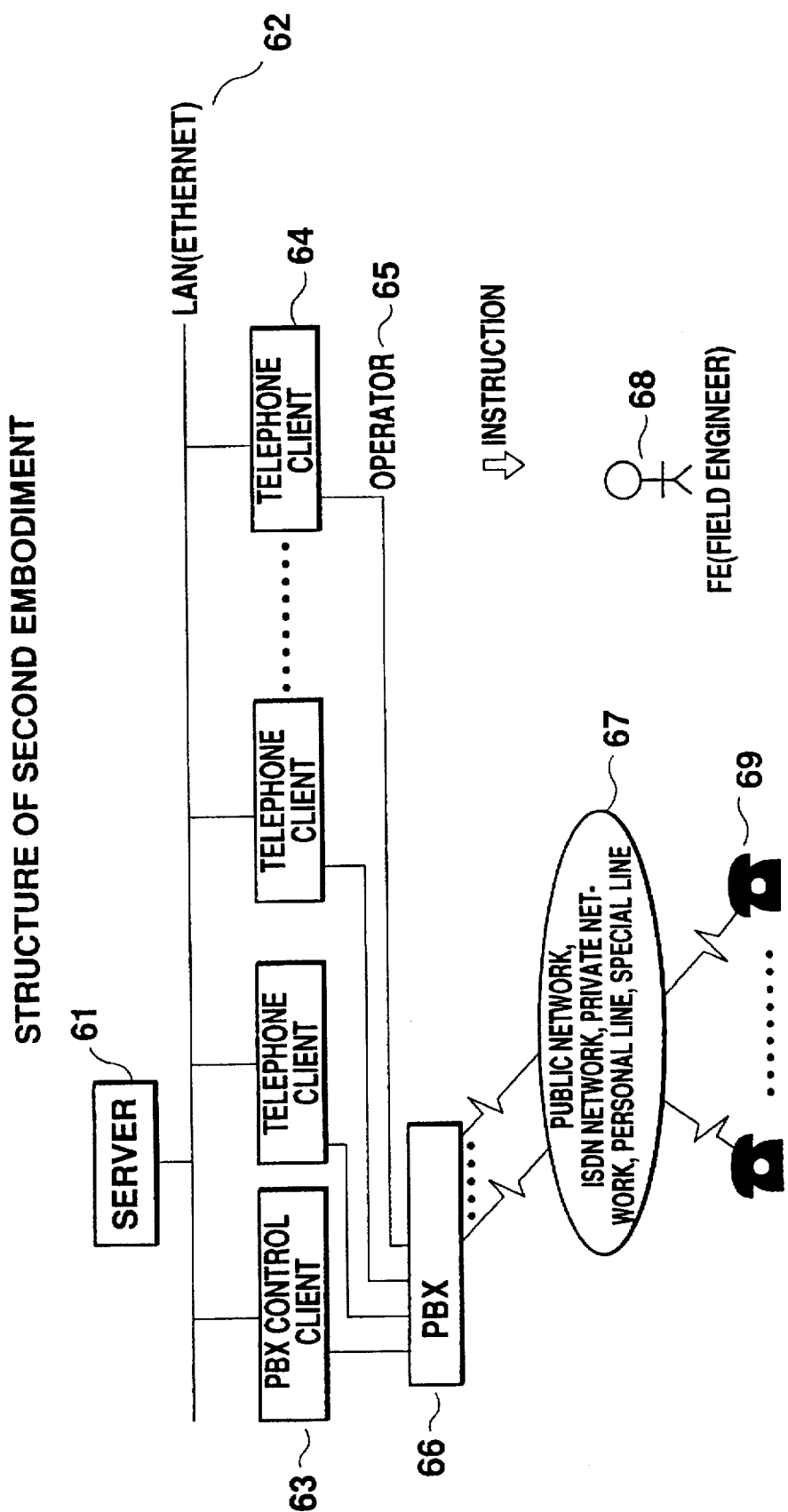
FIG. 14 shows the structure of a second embodiment of the present invention.

A second embodiment of the present invention will be explained with reference to FIG. 14. FIG. 14 shows the structure of a second embodiment of the present invention. As shown in FIG. 14, a server 61 which executes a managing and controlling service as the kernel of the network as a whole is connected to a LAN 62. A PBX control client 63 which controls a telephone in cooperation with the PBX of the telephone, and telephone clients 64 which execute telephony operations are also connected to the LAN 62. To the PBX control client 63 are connected PBXs 66 which handles the telephones of a public network, ISDN network, private network, personal line and special line 67. Operators 65 who execute telephony operations are allotted to the telephone clients 64, and a field engineer 68 corrects a predetermined problem in accordance with the instruction from the operator 65.

The PBX 66 is connected to telephones 69 which are used by users in order to report a problem through the public network, ISDN network, private network, personal line or special line 67.

The operation of the second embodiment will now be explained in detail.

It is now assumed that a problem with an elevator is made known by using the telephone 69. The PBX 66 recognizes the problem and reports to the PBX control client 63 through which telephone the problem has been notified. This reports contains the name of the network area when the network is public, the name of the user when the network is ISDN or private, and the machine number of the telephone when the line is a special line. The PBX control client 63 sets the information on the network of the telephone and additional information at a queue of the server 61. The PBX control client 63 then receives the information on all the telephone clients 64 under operation from the server 61 and triggers the telephone clients 64. The operator 65 who is capable of operating immediately after receiving the telephone from the telephone client 64 touches the position of the corresponding telephone client 64. The corresponding telephone client 64 requests the server 61 to exclusively extract the queue information. When the queue information is extracted, the operator 65 instructs the PBX control client 63 to connect the telephone client 64 to the PBX 66. In this manner, the operator 65 can talk with the calling party using the telephone 69. If it is judged to be necessary during talking through the telephone 69, the field engineer 68 can be immediately sent to the spot.

Third Embodiment

A third embodiment of the present invention will be explained.

Figure 15:
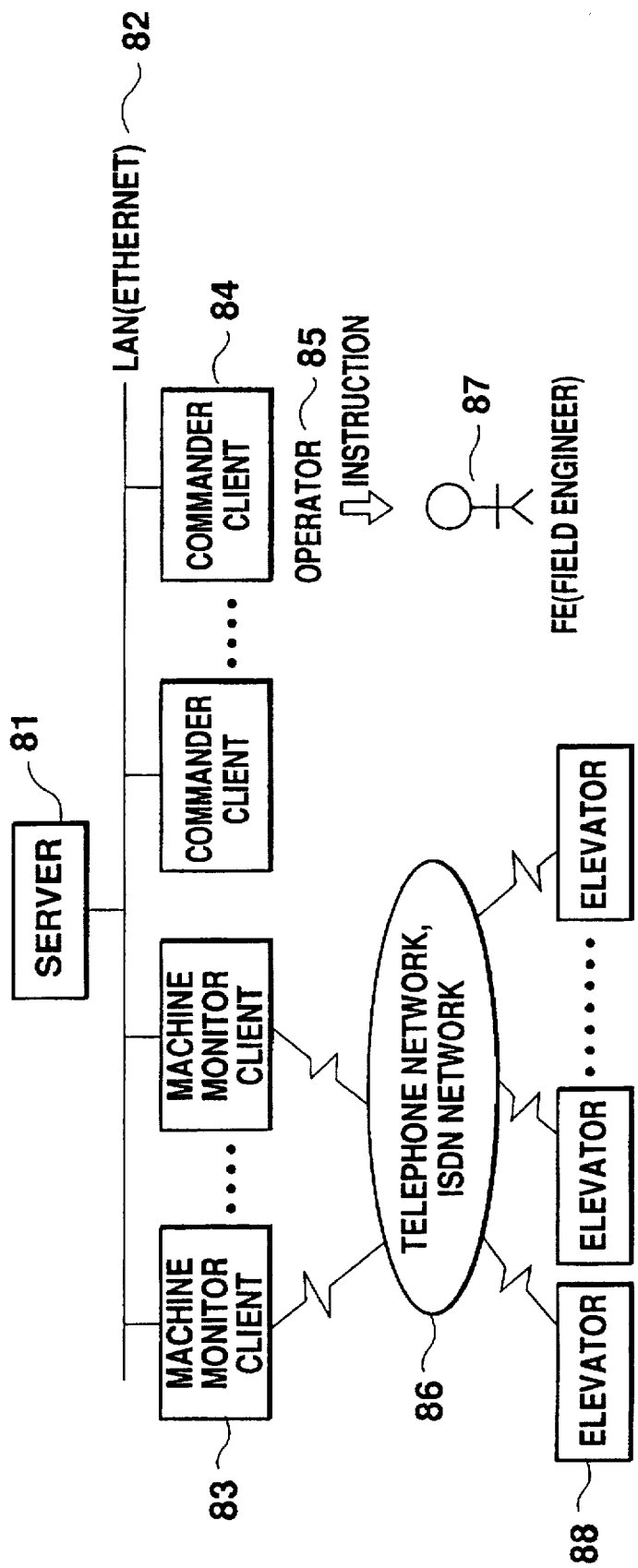
FIG. 15 shows the structure of a third embodiment of the present invention.
Figure 16:
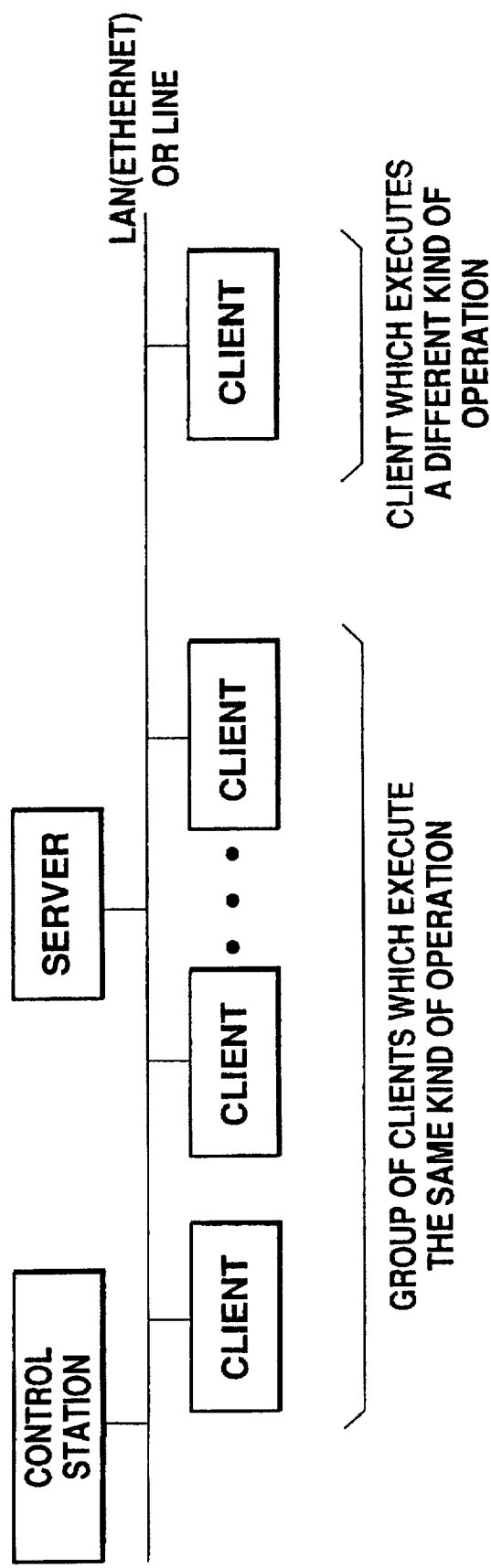
FIG. 16 is a block diagram of the structure of a conventional client-server type network.

FIG. 15 shows the structure of a third embodiment of the present invention. As shown in FIG. 15, a server 81 which executes a managing and controlling service as the kernel of the network as a whole is connected to a LAN 82. Machine monitor clients 83 which monitor a machine at a remote place and commander clients 84 which display the state on the basis of the information supplied from the machine monitor clients 83 or in accordance with the instruction from the operators 85 are also connected to the LAN 82. It is possible to connect the machine monitor clients 83 to elevators 88, which are the objects of machine monitoring, through a communication network 86. The operators 85 can issue a predetermined instruction to a field engineer who repairs the machine 88.

The operation of the third embodiment will now be explained in detail.

When there is a problem in the elevator 88, the problem is reported to the machine monitor client 83 through the communication network 86. The machine monitor client 83 sets the information related to the problem at a queue of the server 81 and extracts from the server 81 the information on the state of the commander clients 84 which are under operation. The machine monitor client 83 then triggers all the commander clients 84. The commander clients 84 receive the trigger and display the state. When the operator 85 can start the next job, the operator 85 touches the screen of the corresponding commander client 84 so as to receive the next job. If the operator 85 judges that it is not necessary to send the field engineer 87 to the spot and it is possible to repair the elevator 88 from the remote place, the operator 85 registers the information on the instruction of repair and the telephone number of the corresponding elevator 88 at a queue of the server 81, receives the information on all the machine monitor clients 83 under operation from the server 81, and triggers all the machine monitor clients 83 under operation on the basis of the information. When the trigger is received, the machine monitor client 83 which can execute the job repairs the elevator 88 in accordance with the information. Attention must be payed to the point that the present invention is effective even between the clients 83 which execute a different kind of operation from the operation of the commander clients 84 which execute the same kind of operation.

As described above, the present invention combines an operating client monitoring and controlling system with a queuing system and a triggering system with one another and produces the following advantages.

Even if one of the clients which execute the same kind of operation is stopped, the efficiency is lowered to the degree corresponding to a reduction in the number of clients, but the stopping of the client does not adversely affect the system as a whole. It is therefore possible to stop one of the clients which execute the same kind of operation or to increase the number of clients without adversely affect the network.

Even if the number of clients which execute the same kind of operation is increased, the efficiency is raised to the degree corresponding to the increase in the number of clients, but the increase does not adversely effect the system as a whole. Stopping of clients and increase in the number of clients which execute the same kind of operation is therefore freely and automatically possible without the help of an operator.

Since there is no polling for extracting information, there is almost no unnecessary load on the LAN, the clients or the server. As a result, a load such as polling is reduced, thereby obviating a special control station.

Even if one of the clients which execute the same kind of operation is stopped, the other clients which execute the same kind of operation take charge of the operation, so that the continuity of the operation is kept. It is therefore possible to ensure the continuity of the information when one of the clients is stopped, and to continue the processing in the preceding state.

Since the polling load is small, a specific control station is obviated and the server can also serve as a control station. Since the queue information is filed in the server, even if the server is stopped due to an abnormality, when the server is started again, continuous operation is possible.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A client-server type network comprising:

a server;

at least one first client, said first client having an address; and a second client which executes an operation different from the operation of said first client, said second client having an address, said server including:

memory means for determining that each of said first and second client is/or under operation when said first and second clients are each under operation, and storing the addresses of said first and second clients which are under operation;

request transferring means for transferring a request for status information of an operational state of one of said first and second clients which are under operation when said request is advanced from another of said first and second clients;

storage means for receiving information from said first and second clients and storing said information in a queue;

information providing means for taking predetermined information from a queue in accordance with a request when said first and second client requests said predetermined information and supplying said predetermined information to the client which requests said predetermined information; and information changing means for determining termination of operation of said first or second client has occurred, and changing the status information in said memory means indicating that said first or second client is under operation to information indicating that said first or second client is no longer operating, when said first or second client advances either a request for a termination of operation or a request for periodic polling so as to deal with an emergency termination of operation due to a problem; and each of said first and second clients including:

first notifying means for notifying said server after said first or second client which has begun operation that said first or second client is under operation;

information extract requesting means for requesting said server to remove information from the queue when said first or second client has begun operation; and information supply means for supplying information to the server to be included in the queue second notifying means for notifying one of said first and second clients that information has been set in said server by triggering said one of said first and second clients.

2. A client-server type network comprising:

a server; and a plurality of clients;

said server including:

operating client managing means for receiving a log-in request from one of the clients which starts operation, and updating a log-in name and a network address for the client in accordance with instructions for setting said log-in name and said network address in a data base;

queue generating means for receiving a queuing request from said client, generating a new queue if there is no directory for queuing or when said client issues an instruction for newly generating a queue as a result of a judgement by said client;

queue receiving means for generating queue information in the form of a file after said new queue is generated or by the judgement of said client;

queue extracting means for receiving a dequeuing request from said client, detecting the queue file on the basis of the queue name, and supplying the detected queue file to said client;

information supplying means for taking out an operational state of said client, said log-in name and said network address from said data base in response to a request from a client and supplying said operational state, said log-in name and said network address extracted from said data base to the client which has generated said request;

information eliminating means for terminating operation of said client and eliminating information from said data base, when said information eliminating means receives a request for termination of operation, namely, a log-out request from said client, eliminating the information on the operational state of said client from said data base when emergency termination of operation of said client due to a problem is recognized; and queue eliminating means for eliminating the information in the queue in accordance with the entry name of the queue supplied from said client; and each of said clients including:

operation initiation notifying means for notifying the initiation of an operation of a client to said server by using a log-in command when said client starts said operation, and instructing said server to set the log-in name and the network address of said client corresponding to the log-in name in said data base in said server;

queue requesting means for requesting said server to queue information and, if said server does not have the queue, requesting said server to generate a file directory in accordance with a queue name and to set information in the generated queue:

queue extracting means for requesting said server to extract information from the queue on the basis of a specified queue name;

operational state requesting means for requesting said server to extract the log-in name and the network address of the client under operation from said data base of the server in order to determine which clients are executing the same kind of operation after said server queues information;

trigger requesting means for obtaining the network addresses of all the clients which are executing the same kind of operation through said operating client managing means after said server queues information and triggering all the clients by using a communication protocol at a lower level;

wait condition setting means for setting a wait condition in the client by asynchronous interruption in order to receive a trigger by using a protocol at a lower level in said network in order to receive information from another client;

trigger information receiving means for receiving trigger information while suspending the job under operation when said trigger information is supplied from another client while the wait condition is set, and returning said client to interrupt processing after said client receives said trigger information;

trigger information recognizing means for judging whether or not trigger information has been delivered at every end of a normal job, and recognizing said trigger information when said trigger information has been delivered; and elimination requesting means for requesting said server to eliminate said queue information when a predetermined processing is finished with success.

3. A server for a client-server type network having a server, at least one first client and a second client which is different from said first client and which executes the same kind of operation as the first client, said first client having an address and said second client also having an address, said server comprising:

memory means for determining that each of said first and second client is under operation when said first and second client are each under operation, and storing the addresses of said first and second clients which are under operation;

request transferring means for transferring a request for status information of an operational state of one of said first and second clients which are under operation when said request is advanced from another of said first and second clients;

storage means for receiving information from said first and second client and storing said information in a queue;

information providing means for extracting a predetermined information from a queue in accordance with a request when said first or second client requests said predetermined information and supplying said predetermined information to the client which requests said predetermined information; and information changing means for judging termination of operation of said first or second client and changing the status information in said memory means indicating that said first or second client is under operation to information indicating that said first or second client is no longer operating, or when said first or second client advances either a request for a termination of operation or a request for periodic polling so as to deal with an emergency termination of operation due to a problem.

4. A client for a client-server type network which is used as a first or a second client in a client-server type network having a server, at least one first client which executes an operation and a second client which executes an operation different from said first client, said client comprising:

first notifying means for notifying said server after said first or second client is started that said first or second client is under operation;

information extract requesting means for requesting said server to extract information from a queue after said first or second client is started; and second notifying means for notifying said second or first client that information has been set in said server by triggering said second or first client on the basis of the information received from said server.

5. A server for a client-server type network having a server and a plurality of clients, said server comprising:

operating client managing means for receiving a log-in request from one of the clients which starts operation and updating a log-in name and a network address for the client in accordance with instructions for setting said log-in name and said network address in a data base;

queue generating means for receiving a queuing request from said client, generating a new queue if there is no directory for queuing or when said client issues an instruction for newly generating a queue as a result of a judgement by said clients;

queue receiving means for generating queue information in the form of a file by utilizing a FIFO after said new queue is generated or by the judgement of said client;

queue extracting means for receiving a dequeuing from said client, detecting the queue file in said FIFO on the basis of the queue name, and supplying the detected queue file to said client;

information supplying means for extracting said operational state of said client, said log-in name and said network address from said data base in response to a request from a client and supplying said operational state, said log-in name and network address extracted from said data base to the client which has output said request;

information eliminating means for terminating the operation of said client and eliminating information from said data base, when said information eliminating means receives a request for termination of operation, namely, a log-out request from said client, eliminating the information on the operational state of said client from said data base when emergency termination of operation of said client due to a problem is recognized; and a queue eliminating means for eliminating the information on the queue in accordance with the entry name of the queue supplied from said client.

6. A client for a client-server type network having a server and a plurality of clients, said the client comprising:

operation initiation notifying means for notifying the initiation of an operation of a client to said server by using a log-in command when said client starts said operation, and instructing said server to set a log-in name and a network address of said client corresponding to the log-in name in a data base in said server;

queue requesting means for requesting said server to queue information and, if said server does not have the queue, requesting said server to generate a file directory in accordance with a queue name and to set information in the generated queue;

queue extracting means for requesting said server to extract information from the queue on the basis of a specified queue name;

operational state requesting means for requesting said server to extract the log-in name and the network address of the corresponding client under operation from said data base of the server in order to determine which clients are executing the same kind of operation after said server queues information;

trigger requesting means for obtaining the network addresses of all the clients which are executing the same kind of operation through said operating client managing means after said server queues information and triggering all the clients by using a communication protocol at a lower level;

wait condition setting means for setting a wait condition in the client by asynchronous interrupt in order to receive a trigger by using a protocol at a lower level in said network in order to receive information from another client;

trigger information receiving means for receiving trigger information while suspending the job under operation when said trigger information is supplied from another client while the wait condition is set, and returning said client to interrupt processing after said client receives said trigger information;

trigger information recognizing means for judging whether or not trigger information has been delivered at every end of a normal job, and recognizing said trigger information when said trigger information has been delivered; and elimination requesting means for requesting said server to eliminate said queue information when a predetermined processing is finished with success.

* * * * *